Figure 1:
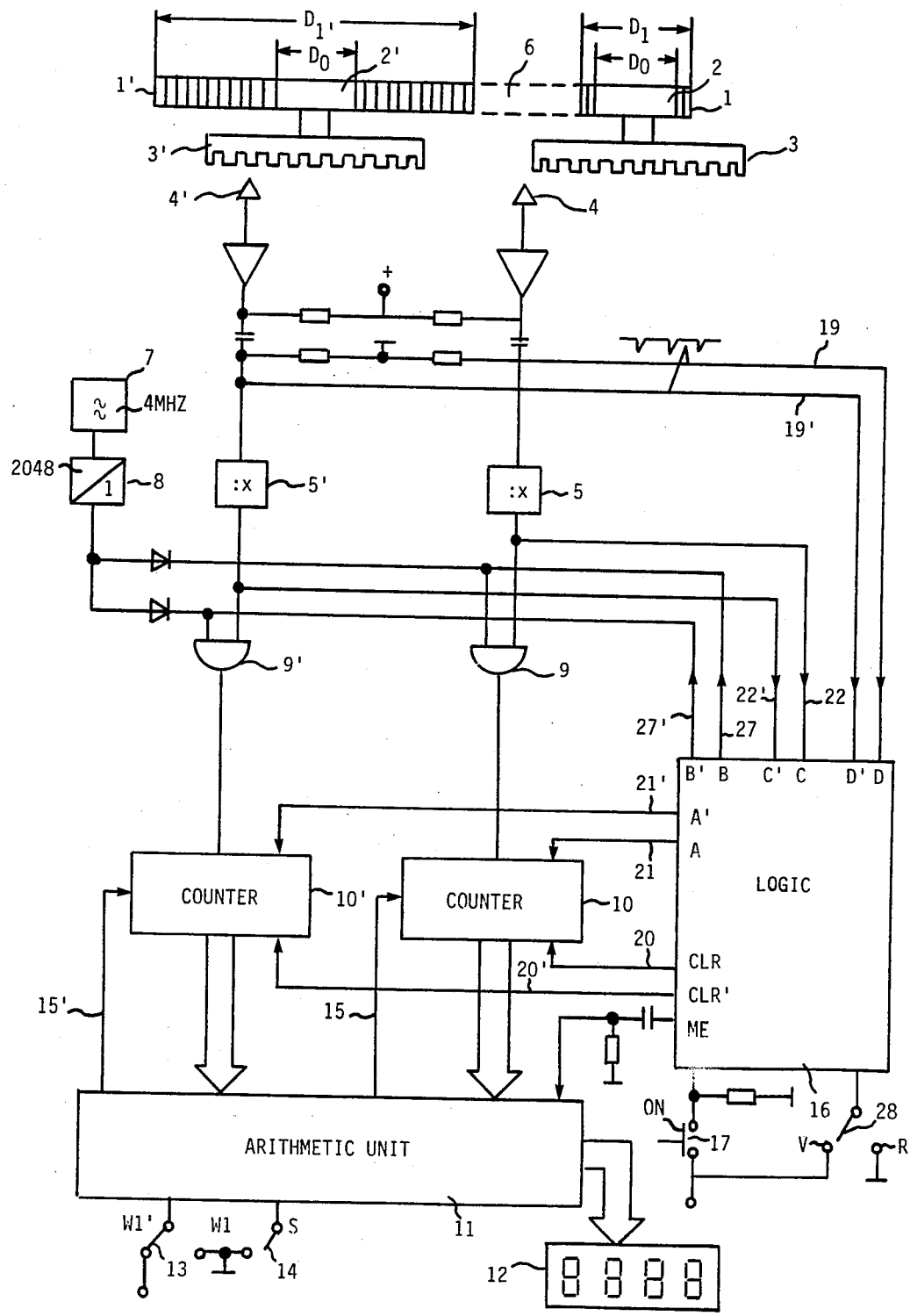

United States Patent [19]

Kaaden

[11] Patent Number: 4,727,446

[45] Date of Patent: Feb. 23, 1988

[54] METHOD OF DETERMINING THE ELAPSED AND/OR STILL AVAILABLE PLAYING TIME OF A MAGNETIC TAPE

[75] Inventor: Jürgen Kaaden, Villingen-Schwenningen, Fed. Rep. of Germany

[73] Assignee: Deutsche Thomson-Brandt GmbH, Villingen-Schwenningen, Fed. Rep. of Germany

[21] Appl. No.: 928,287

[22] PCT Filed: Jan. 24, 1986

[86] PCT No.: PCT/EP86/00030

§ 371 Date: Sep. 22, 1986

§ 102(e) Date: Sep. 22, 1986

[87] PCT Pub. No.: WO86/04722

PCT Pub. Date: Aug. 14, 1986

[30] Foreign Application Priority Data

Feb. 8, 1985 [DE] Fed. Rep. of Germany ....... 3504311

[51] Int. Cl.$^4$ ............................................. G11B 15/00
[52] U.S. Cl. .................................................... 360/137

[58] Field of Search ................ 360/137; 242/186, 191; 116/278

[56] References Cited

U.S. PATENT DOCUMENTS

| | | | |
|---|---|---|---|
| 4,423,455 | 12/1983 | Fukuoka | 360/137 |
| 4,479,159 | 10/1984 | Kamei et al. | 360/137 |
| 4,532,560 | 7/1985 | Williams | 360/137 |
| 4,644,436 | 2/1987 | Unno | 360/137 |

Primary Examiner—Robert S. Tupper
Attorney, Agent, or Firm—Max Fogiel

[57] ABSTRACT

A method of determining the elapsed and/or still available playing time of a magnetic tape. First, the time the spindle takes to rotate once is measured. The number of coils on the spindle are calculated from the spindle diameter, tape thickness, and duration of rotation. The results are entered in a counter that from that time on adds or subtracts one pulse per winding direction and per revolution. The counting results are compared with a table of times layed out in one-minute steps and the resulting minute values displayed.

3 Claims, 3 Drawing Figures

METHOD OF DETERMINING THE ELAPSED AND/OR STILL AVAILABLE PLAYING TIME OF A MAGNETIC TAPE

The point of departure for the invention is a method of determining the elapsed and/or still available playing time of a magnetic tape being wound onto a take-up reel from a supply reel by determining the thickness of the tape and the diameter of the spindle. Determining the residual length of a tape still available on the supply reel of a magnetic-tape player is known from U.S. Pat. No. 4,280,159. That method, however, can only be carried out when the recording base is advancing at a constant speed, and the thickness of the base is ignored. The result is errors of unsatisfactory precision in the display.

Displaying the still available playing time in VHS equipment is known. In this case as well, the operation depends on a constant recording-base advance speed. The display switches off during fast rewinding because it is too inaccurate to be useful.

Determining the instantaneous position of the tape from its relation to the coil diameter in Video 2000 models is also known. In this case, however, the total tape supply of a recording base accommodated in a cassette must be known first, meaning that the cassette must be accordingly coded or the supply must be entered manually, which is often impossible because the overall length of the recording base is not indicated on the housing of the cassette. Manual input is also inconvenient and involves additional operations on the part of the user of the recorder.

German OS No. 2 746 613 discloses a method of determining the supply of a magnetic tape. A signal indicating the speed of rotation is derived both from the supply side and from the take-up side during rewinding the two frequency measurements obtained at prescribed intervals are processed. The interval of time between the measurements is long when the tape is running at low speed and short when the tape is running more rapidly. Although the supply is determined by means of digital arithmetic at low tape speed, it is obtained by analog operations at high speed. Even at high tape speed, however, it is important to display the supply with minute precision in real time, and analog arithmetic is too imprecise to be appropriate.

The object of the invention is to eliminate these drawbacks and provide a method that, independent of the speed of advance—during both normal recording and playback and during rapid search and rewinding that is—will make it possible to display elapsed playing time, remaining playing time, and, when necessary, the sum of both informational components with minute precision. This object is attained in the invention characterized in the main patent claim. The advantage is that it provides satisfactorily reproducible displays of the playing times by supplying an instantaneous coil value after only one time measurement during normal operation, from which value only one pulse per revolution is picked up, independent of the winding speed, and added to or subtracted from the only once measured and calculated value. The precision of counting is independent of the speed that the coil is rotating at.

The invention will now be specified with reference to the drawings, wherein

Figure 2:
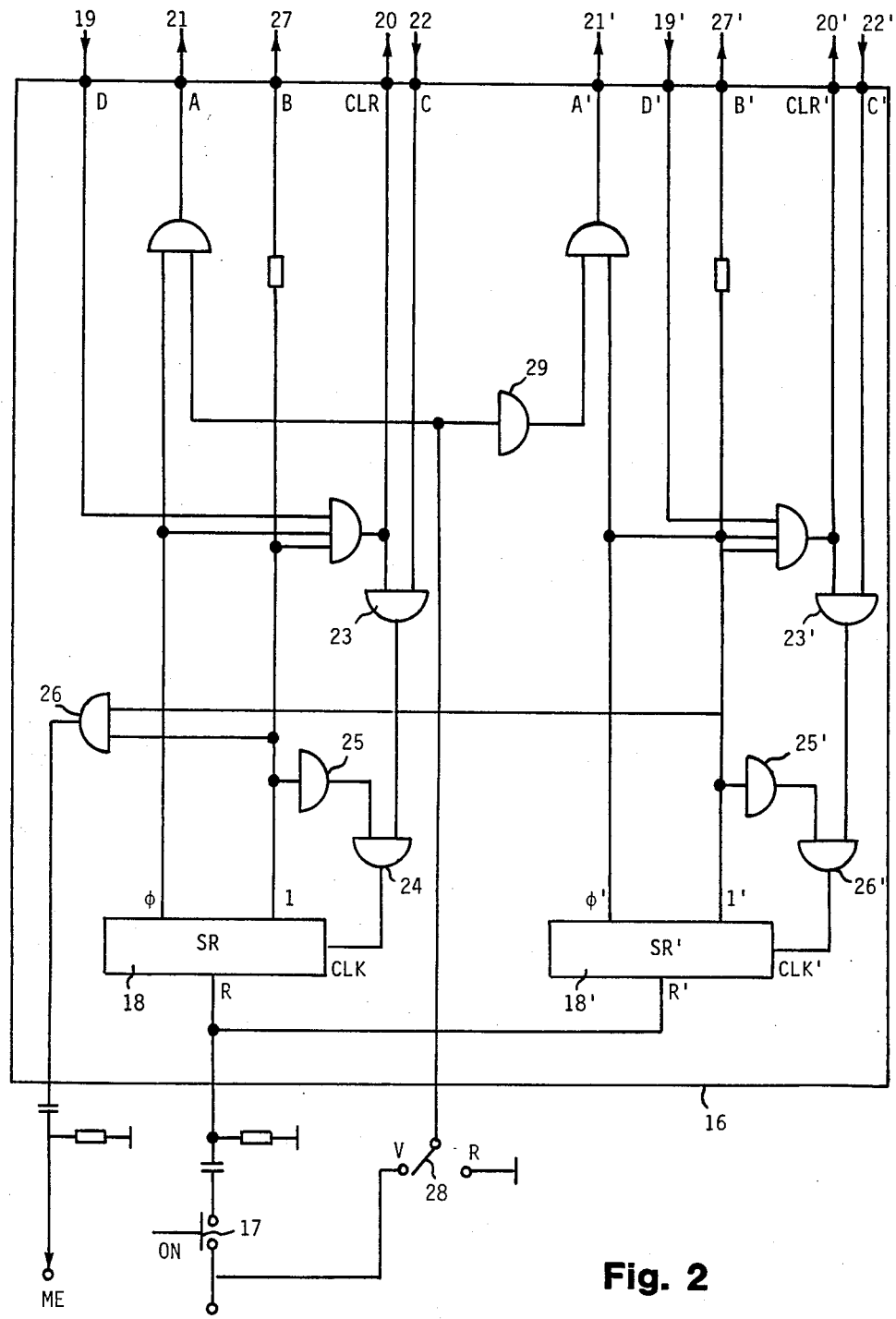
Figure 3:
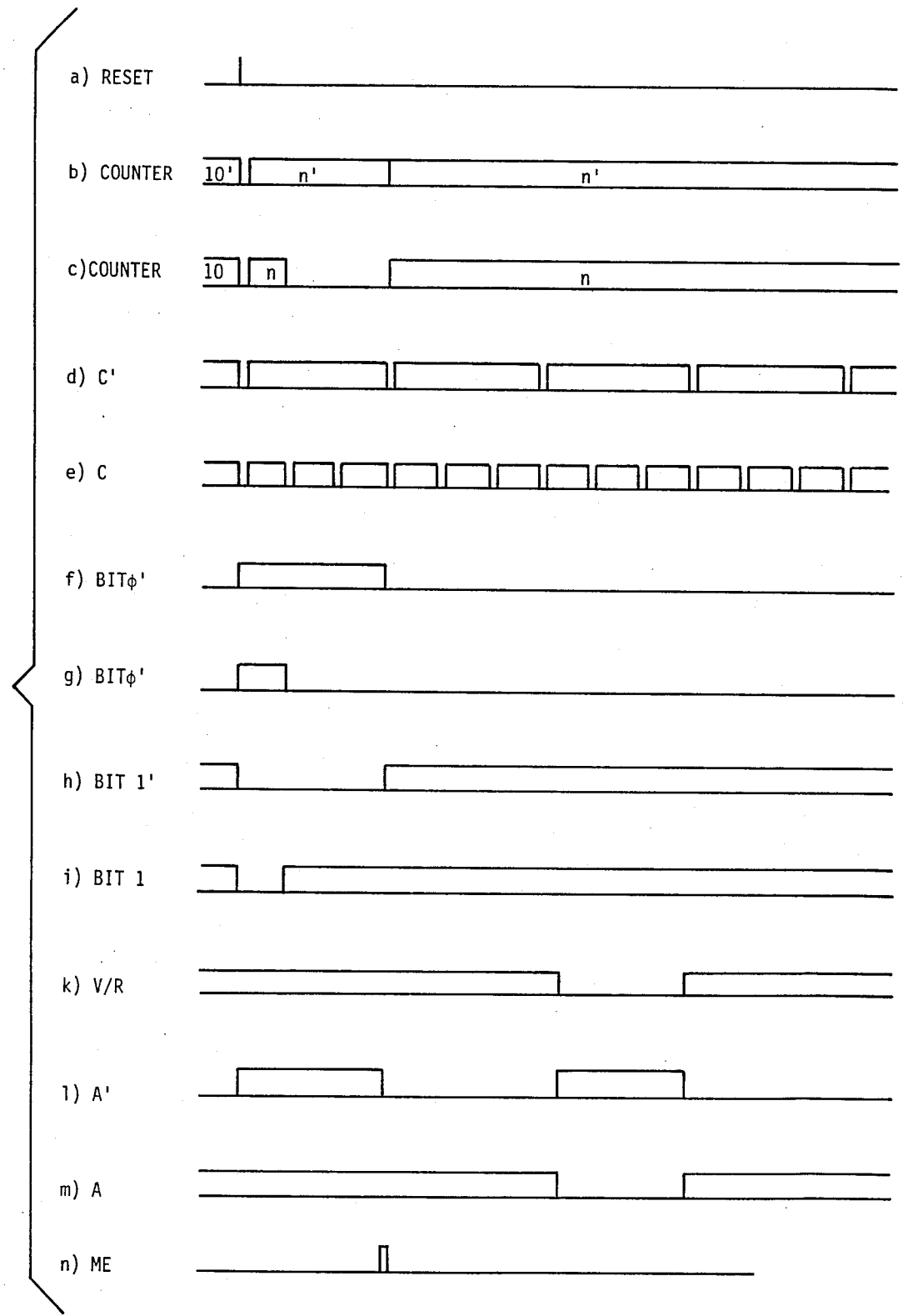

FIG. 1 is a block diagram illustrating the method,
FIG. 2 is a detail of FIG. 1, and
FIG. 3 is a graph of the pulses intended to illustrate the method.

The thickness of the recording base must be determined first. This can be done by means of the method disclosed in Patent Application P No. 3 411 535.8. Once the spindle diameter Do of the particular type of cassette has been established, the time t it takes the spindle to rotate one revolution can be measured. This time varies from coil n to coil n+1 because the rotation time of a coil with a longer diameter will be longer with the recording base advancing at a constant speed.

How spindle diameter Do can be determined will now be specified. Once the tape thickness d has been determined, the times that each tape coil takes to rotate through a complete revolution are measured and added. The resulting time is compared with a table. The fact that there are tapes with thicknesses $d=16$ $\mu$m and $d=20$ $\mu$m is exploited. The following table lists standard dimensions for various tape formats.

| Cassette | d ($\mu$m) | Do (mm) |
| --- | --- | --- |
| E30 | 20 | 62 |
| E60 | 20 | 62 |
| E90 | 20 | 62 |
| E120 | 20 | 26 |
| E180 | 20 | 26 |
| E240 | 16 | 26 |

If, for example, a thickness of $d=16$ $\mu$m is determined, the diameter Do of the spindle will automatically be 26 mm.

At a tape thickness of $d=20$ there are cassettes with two different spindle diameters Do. Time measurement is employed to differentiate between them. The difference in time between the cassettes with the long spindle diameter $Do=62$ mm and those with the short spindle diameter $Do=26$ mm is great enough that the diameter can easily be determined by comparing the time thresholds.

The wound-on length of the first coil n1, the coil that rests directly against the spindle, is $l_1 = \pi(Do+2d)$, wherein d is the thickness of the recording base. The next coils accordingly have lengths $$l_2 = \pi(Do + 4d), \quad (1)$$

$$l_2 = \pi(Do + 4d),$$

$$l_n = \pi(Do + 2nd).$$

The total wound-on length $L_n$ up to coil n is the sum of the aforesaid individual lengths $l_n$:

$$L_n = \sum_{1}^{n} l_n = n\pi[Do + (1 + n)d] \quad (2)$$

Dividing this expression by the constant standard speed v of advance (23.39 mm/sec for example) results in a value T that represents the expired time. Eliminating the n from Equation (2) will yield the value $$n = \sqrt{(\tfrac{1}{2} + Do/2d)^2 + 60vT/\pi d} \ - \tfrac{1}{2} - Do/2d$$

for the wound or unwound coils, wherein T is the elapsed or still available playing time in minutes, v the given speed of advance in mm/sec, Do the diameter of the particular spindle in mm, and d the thickness of the tape in mm. Equations (2) and (3) can be employed to determined the elapsed and still available times with minute precision.

The time that the spindle takes to complete one revolution varies from coil to coil, depending, that is, on n, and can be calculated from $$t_n = \frac{l_n}{v} = \frac{\pi(Do + 2nd)}{v} \quad (4)$$

which yields a value $$n = \frac{vt_n - \pi Do}{2\pi d} \quad (5)$$

for the coils still on the reel. Inserting (5) into (3) will result in a time $$T = \frac{(vt_n + \pi d)^2 - \pi^2(Do + d)^2}{240 \pi dv} \quad (6)$$

in minutes for the tape wound on the reel—the tape still available on the supply reel or the already played tape on the take-up reel.

FIG. 1 illustrates a cassette with a supply reel 1' and a take-up reel 1 wound on spindles 2 and 2'. The diameter of the spindles is Do and those of coils 1 and 1', which vary from revolution to revolution, D1 and D1' respectively. Rigidly connected to spindles 2 and 2' are pulse generators 3 and 3'. The generators have for example x teeth, and sensors 4 and 4' emit x pulses per revolution. The pulses travel to divider stages 5 and 5', which divide them by a factor x that corresponds to the number of teeth on pulse generators 3 and 3'. Thus one pulse per revolution arrives at the output of divider stages 5 and 5'. The time taken by each coil to complete a revolution is measured. Coil 1, which has shorter diameter D1, will rotate more rapidly with magnetic tape 6 advancing at a constant speed than will coil 1', which has longer diameter D1'. Time is measured by counting pulses deriving from an oscillator 7 and arriving at gates 9 and 9' through a divider stage 8. Counter states Z and Z' are supplied in the form of pulses, counted in counters 10 and 10', to an arithmetic unit 11 that determines coil-revolution times t and t' from the counter states and from the given duration of the sequence of pulses derived from divider stage 8. From the computed times the coils n or n' on the spindles at any given instant can be determined in accordance with Equation (5) and entered into counters 10 and 10' through lines 15 and 15'. Upon termination of time determination, counters 10 and 10' are reset to function as forward or reverse counters depending on the direction that magnetic tape 6 is traveling in. Since coil 1' is being unwound and coil 1 wound in the figure, counter 10 counts up 1 and and counter 10' down from the detected counter state per revolution of coils 1 and 1'. The counter states, every one of which corresponds to a particular coil number, are stored in a permanent memory in the arithmetic unit in such a way that the corresponding coil value is associated with a particular minute value. The counter states are constantly compared with the corresponding minute states and played back in a display 12. Depending on the setting of a selector switch 13, either the elapsed time or the time still available can be displayed. Another switch 14 makes it possible to display the sum of both times. Each time value can be computed from the difference between the other time value and the elapsed or remaining time and displayed.

The processes are controlled with a logic circuit 16, which will now be specified with reference to FIG. 2 and to the pulse graphs in FIG. 3. As measurement begins, a switch 17 is activated and supplies a reset pulse (FIG. 3a) to shift registers 18 and 18'. For D and D', negative pulse edges arrive separated by 1/x a complete revolution at lines 19 and 19' in lines 20 and 20' at outputs CLR and CLR', zeroing counters 10 and 10' (FIGS. 3b & 3c). The BIT 0 outputs from shift registers 18 and 18' switch to 1 (FIGS. 3f and 3g) and shift counters 10 and 10' over to forward counting through lines 21 and 21'. Pulse are now counted out of divider stage 8 through AND gates 9 and 9' until each coil 1 and 1' has rotated through one complete revolution, until, that is, a pulse arrives over lines 22 and 22'. These pulses shift the BIT 1 outputs of the shift register to 1 through gates 23, 23', 24, and 24', and are blocked to further pulses through gates 25, 25', 24, and 24'. When both BIT 1 outputs are set at 1 (FIGS. 3h and 3i) an end-measurement signal ME is sent to arithmetic unit 11 through a gate 26 (FIG. 3n). From now on gates 9 and 9' are opened through lines 27 and 27' for pulses from divider stages 5 and 5' and release one pulse per revolution of coils 1 and 1' to counters 10 and 10' (FIGS. 3d & e). As of this point in time the counter is set for reverse counting for each unwinding coil (FIG. 31). When the winding direction is reversed (FIGS. 3i, 3k, & 3m), counters 10 and 10' are automatically shifted into the opposite counting direction through switch 28 and gate 29.

I claim:
1. Method of determining the elapsed and/or still available playing time of a magnetic tape being wound onto a take-up reel from a supply reel by determining the thickness of the tape and the diameter of the spindle, comprising the steps of:
    (a) measuring the time the spindle takes to rotate once,
    (b) calculating the coils on the spindle from spindle diameter, tape thickness, and results of said measuring step,
    (c) entering the results of said calculating step in a counter,
    (d) shifting the direction that the counter counts depending on whether the counter is associated with the supply reel or the take-up reel,
    (e) switching the counter further by pulses generated per rotation of the take-up reel or supply reel,
    (f) comparing the counting results corresponding to the coil number and stored in the counter with a time table stored in the magnetic tape and listing a time value for every coil number, and
    (g) displaying the time value that corresponds to the instantaneous coil number.

2. Method as defined in claim 1, wherein time is measured with respect to both the supply side and the take-up side and a counter is associated with each side.

3. Method as defined in claim 1, wherein the results are separately stored and can be separately called up and displayed.

* * * * *